United States Patent [19]

Hanks et al.

[11] Patent Number: 4,557,506

[45] Date of Patent: Dec. 10, 1985

[54] DUAL-ROTARY UNION, ROTATIONAL ISOLATION ADAPTER

[75] Inventors: James V. Hanks, Robbinsdale; Leonid Dayen, Plymouth, both of Minn.

[73] Assignee: Horton Manufacturing Co., Inc., Minneapolis, Minn.

[21] Appl. No.: 620,852

[22] Filed: Jun. 15, 1984

[51] Int. Cl.[4] .............................................. F16L 27/08
[52] U.S. Cl. .................................. 285/39; 192/85 A; 192/85 AT; 192/85 R; 285/190
[58] Field of Search .......... 192/85 A, 85 AA, 85 AB, 192/85 AT, 85 R; 285/136, 190, 39

[56] References Cited

U.S. PATENT DOCUMENTS

| | | |
|---|---|---|
| 1,968,129 | 7/1934 | Criley . |
| 2,384,281 | 9/1945 | Carter . |
| 2,693,373 | 11/1954 | Tremolada . |
| 2,701,146 | 2/1955 | Warren . |
| 2,812,960 | 11/1957 | Walsh . |
| 2,818,949 | 1/1958 | Giffen . |
| 2,886,346 | 5/1959 | Nixon . |
| 3,202,252 | 8/1965 | Schilling . |
| 3,887,051 | 6/1975 | Bignell ............................ 192/85 AA |
| 4,425,993 | 1/1984 | Schilling ............................ 192/85 A |

FOREIGN PATENT DOCUMENTS

| | | |
|---|---|---|
| 229910 | 4/1959 | Australia . |
| 230716 | 10/1959 | Australia . |
| 0064935 | 11/1982 | European Pat. Off. .......... 192/85 A |
| 639052 | 11/1936 | Fed. Rep. of Germany ........ 192/85 AA |

*Primary Examiner*—Martin P. Schwadron
*Assistant Examiner*—Stephen M. Hepperle
*Attorney, Agent, or Firm*—Peterson, Wicks, Nemer & Kamrath

[57] ABSTRACT

A dual-rotary union, rotational isolation adapter according to the teachings of the present invention is disclosed bridging between a rotary union in fluid communication with a source of fluid pressure and a rotation control apparatus portion rotatable with respect to a shaft. In the present invention, an adapter body is rotatably and removeably secured to the end of the shaft. In its most preferred form, the adapter body is rotatably mounted by a pin threadably received in the end of the shaft and rotatably mounted by a bearing received within a first cavity formed in the adapter body. In its most preferred form, the rotary union is received within a second cavity formed in the adapter body opposite the first cavity. Thus, the adapter body is rotatable with respect to and rotatably isolated from the source of fluid pressure by the rotary union. Additionally, the adapter body is simultaneously rotatable with respect to and rotatably isolated from the shaft by the bearing rotatably mounting the shaft securement pin. Fluid communication can then be provided between the rotational control apparatus portion and the rotary union for activating the rotational control apparatus portion. Thus, the body portion rotates with the rotational control apparatus portion and is rotatably independent from the shaft and the source of fluid pressure.

20 Claims, 1 Drawing Figure

DUAL-ROTARY UNION, ROTATIONAL ISOLATION ADAPTER

BACKGROUND

The present invention relates generally to rotational control apparatus, particularly to provisions supported directly by the shaft for providing fluid pressure to a rotation control apparatus portion rotatable with respect to the shaft, and specifically to dual-rotary union, rotational isolation adapters.

Problems exist particularly in connection with fluid actuated rotational control apparatus. In such rotational control apparatus, a source of fluid pressure is in fluid communication with a part of the rotational control apparatus such as a piston which is to be actuated. If such part is rotating and the source of fluid pressure is stationary, as it generally is, problems exist in regard to providing such fluid communication.

These problems particularly arise in clutches or the like, since brakes generally have a portion which is stationary with respect to the source of fluid pressure or external housing. In the case of brakes, fluid communication and actuation may often be made with respect to such stationary portion. Clutches, in contradistinction, are generally composed of at least two portions, with one portion connected to the shaft either directly or through intervening elements, and another portion which is rotatably mounted with respect to the shaft and which interacts with the first portion. Thus, suitable provisions such as rotary unions must be provided for allowing fluid communication between a stationary source of fluid pressure and one rotating portion of the clutch.

If the portion of the rotational control apparatus desired to be actuated rotates with the shaft, the rotary union could be directly or indirectly connected to the shaft. For example, U.S. Pat. No. 4,408,685 assigned to Horton Industries, Inc. discloses structure of this type to solve this problem.

On the other hand, if the portion of the rotational control apparatus desired to be actuated is rotatably mounted with respect to the shaft, the rotary union could be directly or indirectly connected to the portion which is rotatably mounted with respect to the shaft. Often this portion is in the form of a housing and the rotary union is connected to an end cap for this housing. An example of such an end cap approach is shown in U.S. Pat. No. 4,425,993 also assigned to Horton Industries, Inc. When an end cap approach is used, however, and especially if the apparatus has a large radius, the end cap approach can present significant design problems. The end cap adds weight, adds inertia, and increases costs. The end cap requires careful machining to allow for balance. The end cap provides centrifugal problems because of the large amount of mass radially spaced from the shaft upon which it is generally centered for rotation.

In situations where it is wished to provide fluid pressure from a stationary source to a rotational control apparatus such as a clutch, in particular, where the portion to which fluid pressure is desired is rotatably mounted with respect to the shaft, it has been discovered that no solution was known where the rotary union is mounted directly to the shaft but rotatably isolated from the shaft to avoid the problems encountered by end cap type approaches.

SUMMARY

The present invention solves these and other problems by providing a dual-rotary union, rotational isolation adapter. An adapter body is provided directly secured to and rotatable with respect to the end of a shaft and for mounting a rotary union. Thus, the adapter body is rotationally isolated from the source of fluid pressure by the rotary union and is simultaneously rotationally isolated from the shaft. Fluid communication is provided between the rotary union and the rotational control apparatus portion rotatable with respect to the shaft.

Thus, it is an object of the present invention to provide novel provisions for providing fluid communication between a source of fluid pressure and a rotational control apparatus portion rotatable with respect to a shaft.

It is further an object of the present invention to provide novel provisions connected to and supported by a shaft for providing fluid communication between a source of fluid pressure and a rotational control apparatus portion rotatable with respect to the shaft.

It is further an object of the present invention to provide a novel dual-rotary union, rotational isolation adapter.

It is further an object of the present invention to provide such a novel adapter which minimizes balancing and centrifugal force problems.

It is further an object of the present invention to provide such a novel adapter which reduces inertia.

It is further an object of the present invention to provide such a novel adapter which is convenient and relatively inexpensive to utilize.

It is further an object of the present invention to provide such a novel adapter which avoids problems encountered by prior end cap approaches.

It is further an object of the present invention to provide such a novel adapter which is tolerant of shaft length.

It is further an object of the present invention to provide such a novel adapter which is removeably secured to the shaft.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying FIGURE showing a cross-sectional view of a dual-rotary union, rotational isolation adapter constructed according to the preferred embodiment of the present invention.

The FIGURE is drawn for ease of explanation of the basic teachings of the present invention only; the extensions of the FIGURE with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

When the terms, "top", "bottom", "first", "second", "inside", "outside", and similar terms are used herein, it should be understood that these terms have reference only to the structure shown in the drawings as it would appear to a person viewing the drawings and are utilized only to facilitate describing the invention.

DESCRIPTION

A dual-rotary union, rotational isolation adapter constructed according to the teachings of the present invention is shown in its most preferred form in the drawings and generally designated 10. Adapter 10 includes a body 12 being dynamically balanced about a longitudinal axis and having a first end 14 and a second end 16. In its most preferred form, body 12 has a cylindrical shape.

Body 12 includes suitable provisions 18 for receipt of a rotary union 20 shown in its most preferred form as a cavity extending longitudinally inward from end 14. Cavity 18 is also dynamically balanced about the longitudinal axis of body 12.

Rotary union 20 can be of a variety of constructions according to the teachings of the present invention such as shown in U.S. Pat. Nos. 4,408,685 and 4,425,993 or as generally shown in the drawings. Rotary union 20 generally includes a body portion 22 being dynamically balanced about a longitudinal axis and having a first, open end 24 and a second, closed end 26. A first fluid communication member 28 is further provided in fluid communication with a source of fluid pressure. Member 28 is rotatably mounted in first end 24 of body portion 22 by bearing 30. A second fluid communication member 32 is further provided slideably mounted in body portion 22 and rotatably related thereto. Member 32 is biased in body portion 22 by spring 33 against and in fluid communication with member 28. Member 32 is also dynamically balanced about the longitudinal axis. Rotary union 20 is received within cavity 18 and secured therein by a retaining member 34 secured to body 12 by bolts 36 extending into end 14. The longitudinal axis of the rotary union 20 lies along the longitudinal axis of body 12. Suitable sealing members 38 such as O-rings can be provided for sealing body portion 22 and rotary union 20 within cavity 18 of body 12 for creating a fluid chamber by and between body portion 22 and cavity 18.

First and second passageways 40 and 42 are formed in body 12 in fluid communication with cavity 18 and the fluid chamber defined by and between body portion 22 and cavity 18. Suitable provisions 44 for providing fluid communication between member 32 and cavity 18 and the fluid chamber defined by and between body portion 22 and cavity 18 is also provided such as a passageway in body portion 22 extending therebetween. Suitable fluid conduit connections 46 are provided in fluid communication with passageways 40 and 42.

Adapter 10 further includes suitable provisions 48 for removeable, rotatable mounting of body 12 to a shaft or inner element 74. Provision 48 is shown in the preferred embodiment as a pin 50 including a shoulder 52 formed thereon and located between first and second ends 54 and 56 of pin 50. Shoulder 52 is shown having a hexagonal circumferencial surface. A bearing 58 is further provided on pin 50 held in an abutting relation with shoulder 52 by a retaining ring 60 received in an annular cavity 62 formed in pin 50 adjacent end 54. Body 12 includes a cavity 64 extending longitudinally inward from end 16. Cavity 64 includes an annular shoulder 66.

Bearing 58 is held in cavity 64 in an abutting relation with shoulder 66 by a retaining ring 68 received in an annular cavity 70 formed in cavity 64 adjacent end 16. It should then be appreciated that shoulder 66 is located at a spaced relation from the end of cavity 64 sufficient to accommodate the length of pin 50 extending beyond bearing 58. Thus, pin 50 is rotatably mounted with respect to body 12 by bearing 58.

Suitable provisions 72 for removeably securing pin 50 to shaft 74 are further provided. Provision 72 is shown in its most preferred form as a threaded portion 76 for threadable receipt within a threaded end cavity 78 formed in shaft 74. It can then be appreciated that a wrench can be placed around the hexagonal circumferencial surface of shoulder 52 for purposes of tightening threaded portion 76 into cavity 78 of shaft 74.

It can then be appreciated that body 12 is rotationally independent from communication member 28 of rotary union 20 by bearing 30. Likewise, body 12 is rotationally independent from pin 50 and shaft 74 by bearing 58.

In utilizing adapter 10 according to the teachings of the present invention, pin 50 may be secured to shaft 74 for solely supporting adapter 10 thereby. Fluid conduits can be provided extending between connections 46 of adapter 10 and the clutch portion in turn rotatably mounted with respect to shaft 74. Fluid pressure from the source of fluid pressure can then be introduced to actuate the rotational control apparatus through these fluid conduits, connections 46, passageways 40, 42, and 44, and fluid communication members 28 and 32. It can then be appreciated that body 12 and body portion 22 of adapter 10 is rotatably related to and rotates with the clutch portion rotatably mounted with respect to shaft 74. Further, it can be appreciated that body 12 and body portion 22 of adapter 10 is rotatable with respect to fluid communication member 28 which is stationary along with the source of fluid pressure and simultaneously is rotatable with respect to shaft 74 and/or the other clutch portion whether or not they are stationary or rotating at speeds the same as or different from the rotational speed of body 12.

It can be appreciated that utilizing the present invention results in several advantages. First, adapter 10 is directly supported by the shaft and is yet isolated rotationally from the shaft. Thus, adapter 10 can be utilized to provide fluid pressure actuation to the rotational control apparatus portion rotatatably mounted with respect to the shaft and is mounted and supported directly to the rotating shaft to avoid problems encountered by prior end cap approaches utilized. Additionally, adapter 10 according to the teachings of the present invention can be smaller, has less weight, requires less by way of machining because it requires only centering on the shaft, and takes less by way of balance because only some consideration to hose weights and positioning must be made than in prior end cap approaches. Additionally, the rotational control apparatus portion rotationally mounted with respect to the shaft can be formed of less mass and of a less complicated design reducing mass supported at a radial distance from the shaft reducing inertia and balancing and centrifugal problems than in prior end cap approaches. Thus, adapter 10 mounted and supported directly to shaft 74 according to the teachings of the present invention is then more convenient, less costly, and centered to minimize balance problems than prior solutions in this environment.

The present invention also is more tolerant of shaft length and can allow the shaft to project out several inches without providing an awkwardly cupped end cap as has been required in the past. Shaft length is then not critical utilizing the present invention.

Adapter 10 according to the teachings of the present invention provides a strategically placed second bearing for rotary union 20 for an added degree of rotational freedom and free wheeling to rotary union 20. Thus, the present invention provides a bridge between: (1) a shaft rotating at one speed; (2) the actuation (fluid or air) supply to the part desired which is rotating at a second speed not necessarily equal to the shaft speed; and (3) the assumedly stationary actuation source. The present invention then combines the convenience of an ordinary rotary union, removeable connection directly to a shaft, and rotational isolation from the shaft. The present invention further provides an additional degree of freedom with a simplicity and ease of design which cannot be provided by prior end cap approaches.

Now that the basic teachings of the present invention have been explained, many extensions and variations will be obvious to one having ordinary skill in the art. For example, although air is preferred as the actuating fluid, it will be immediately recognized that other actuating fluidic media may be substituted according to the teachings of the present invention.

Also, where it is indicated that the source of fluid pressure and communicating member 28 are stationary, this is, of course, only a frame of reference. The rotation of shaft 74, body 12, body portion 22, and the rotational control apparatus portions as described are with respect to the rotational position of the source of fluid pressure. Of course, if the source of fluid pressure is rotating, the other parts described would have rotational relationships with respect to the rotational position of the source of fluid pressure.

Further, while the present invention has been described specifically with respect to a clutch, it is immediately obvious that any rotational control apparatus which requires parts or portions to be fluidically actuated and are rotating at differing speeds are intended to be embraced herein.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. In connection with a shaft being rotatable about an axis and having an end and a source of fluid pressure, with the improvement comprising a dual-rotary union, rotational isolation adapter comprising, in combination: a rotary union, with the rotary union including a first fluid communication member in fluid communication with the source of fluid pressure and a second fluid communication member in fluid communication with the first fluid communication member, with the second fluid communication member being rotatable with respect to the first fluid communication member along the shaft rotation axis; an adapter body being substantially dynamically balanced about the shaft rotation axis; means for mounting the rotary union to the adapter body with the second fluid communication member being in the same rotatable position as the adapter body and with the first fluid communication member being rotatable with respect to the adapter body; means for providing fluid communication from the second fluid communication member and externally of the adapter body; and means for rotationally mounting the adapter body about the shaft rotation axis to the end of the shaft for sole support by the shaft allowing the adapter body to be rotationally isolated from the first communication member of the rotary union and simultaneously rotationally isolated from the shaft; wherein the shaft rotationally mounting means comprises, in combination: a pin having a first end and a second end; means for rotatably mounting the pin about the shaft rotation axis adjacent the first end to the adapter body; and means for removeably connecting the second end of the pin to the end of the shaft.

2. The dual-rotary union, rotational isolation adapter of claim 1 wherein the pin rotatably mounting means oomprises, in combination: a cavity extending inwardly into the adapter body and substantially dynamically balanced about the shaft rotation axis; and a bearing located between the cavity and the pin for rotatably mounting the pin within the cavity.

3. The dual-rotary union, rotational isolation adapter of claim 2 wherein the shaft rotationally mounting means further comprises, in combination: an annular shoulder formed around the pin between its first and second ends; means for retaining the bearing on the pin in an abutting relation with the annular shoulder of the pin; an annular shoulder formed in the cavity; and means for retaining the bearing in the cavity in an abutting relation with the annular shoulder of the cavity.

4. The dual-rotary union, rotational isolation adapter of claim 2 wherein the removeably connecting means comprises, in combination: a threaded, internal cavity extending longitudinally inwardly from the end of the shaft; and a threaded portion formed adjacent the second end of the pin for threadable receipt in the threaded, internal cavity of the shaft.

5. The dual-rotary union, rotational isolation adapter of claim 4 wherein the annular shoulder of the pin includes an outer circumferencial surface for engagement by a wrench for tightening the threaded portion of the pin within the threaded, internal cavity of the shaft.

6. The dual-rotary union, rotational isolation adapter of claim 5 wherein the rotary union further includes a body portion, with the second fluid communication member being slideably mounted to and in the same rotational position as the body portion, with the first fluid communication member being rotatable within the body portion along the shaft rotation axis; means for biasing the second fluid communication member in the body portion to engage the first fluid communication member; and wherein the rotary union mounting means comprises, in combination: a rotary union cavity extending inwardly into the adapter body and substantially dynamically balanced about the shaft rotation axis, with the body portion of the rotary union being received within the rotary union cavity and in the same rotatable position as the adapter body.

7. The dual-rotary union, rotational isolation adapter of claim 6 further comprising, in combination: means for sealing the body portion within the rotary union cavity to form a fluid chamber by and between the body portion and the rotary union cavity; and wherein the fluid communication means comprises, in combination:

means for providing fluid communication between the second fluid communication member and the fluid chamber; and means for providing fluid communication from the fluid chamber and externally of the adapter body.

8. The dual-rotary union rotational isolation adapter of claim 1 wherein the removeably connecting means comprises, in combination: a threaded, internal cavity extending longitudinally inwardly from the end of the shaft; and a threaded portion formed adjacent the second end of the pin for threadable receipt in the threaded, internal cavity of the shaft.

9. The dual-rotary union, rotational isolation adapter of claim 1 wherein the rotary union further includes a body portion, with the second fluid communication member being slideably mounted to and in the same rotational position as the body portion, with the first fluid communication member being rotatable within the body portion along the shaft rotation axis; means for biasing the second fluid communication member in the body portion to engage the first fluid communication member; and wherein the rotary union mounting means comprises, in combination: a rotary union cavity extending inwardly into the adapter body and substantially dynamically balanced about the shaft rotation axis, with the body portion of the rotary union being received within the rotary union cavity and in the same rotatable position as the adapter body.

10. The dual-rotary union, rotational isolation adapter of claim 9 further comprising, in combination: means for sealing the body portion within the rotary union cavity to form a fluid chamber by and between the body portion and the rotary union cavity; and wherein the fluid communication means comprises, in combination: means for providing fluid communication between the second fluid communication member and the fluid chamber; and means for providing fluid communication from the fluid chamber and externally of the adapter body.

11. In connection with a shaft being rotatable about an axis and having an end and a source of fluid pressure, with the improvement comprising a dual-rotary union, rotational isolation adapter comprising, in combination: a rotary union, with the rotary union including at least a first fluid communication member in fluid communication with the source of fluid pressure; an adapter body being substantially dynamically balanced about the shaft rotation axis; means for mounting the rotary union to the adapter body with the first fluid communication member being rotatable with respect to the adapter body; means for providing fluid communication from the first fluid communication member and externally of the adapter body; and means for rotationally mounting the adapter body about the shaft rotation axis to the end of the shaft for sole support by the shaft allowing the adapter body to be rotationally isolated from the first communication member of the rotary union and simultaneously rotationally isolated from the shaft; wherein the shaft rotationally mounting means comprises, in combination: a pin having a first end and a second end; means for rotatably mounting the pin about the shaft rotation axis adjacent the first end to the adapter body; and means for removeably connecting the second end of the pin to the end of the shaft.

12. The dual-rotary union, rotational isolation adapter of claim 11 wherein the pin rotatably mounting means comprises, in combination: a cavity extending inwardly into the adapter body and substantially dynamically balanced about the shaft rotation axis; and a bearing located between the cavity and the pin for rotatably mounting the pin within the cavity.

13. The dual-rotary union, rotational isolation adapter of claim 12 wherein the shaft rotationally mounting means further comprises, in combination: an annular shoulder formed around the pin between its first and second ends; means for retaining the bearing on the pin in an abutting relation with the annular shoulder of the pin; an annular shoulder formed in the cavity; and means for retaining the bearing in the cavity in an abutting relation with the annular shoulder of the cavity.

14. The dual-rotary union, rotational isolation adapter of claim 13 wherein the removeably connecting means comprises, in combination: a threaded, internal cavity extending longitudinally inwardly from the end of the shaft; and a threaded portion formed adjacent the second end of the pin for threadable receipt in the threaded, internal cavity of the shaft.

15. The dual-rotary union, rotational isolation adapter of claim 14 wherein the annular shoulder of the pin includes an outer circumferential surface for engagement by a wrench for tightening the threaded portion of the pin within the threaded, internal cavity of the shaft.

16. The dual-rotary union, rotational isolation adapter of claim 15 wherein the rotary union further comprises, in combination: a second fluid communication member in fluid communication with the first fluid communication member, with the second fluid communication member being rotatable with respect to the first fluid communication member along the shaft rotation axis; and a body portion, with the second fluid communication member being slideably mounted to and in the same rotational position as the body portion, with the first fluid communication member being rotatable within the body portion along the shaft rotation axis; means for biasing the second fluid communication member in the body portion to engage the first fluid communication member; and wherein the rotary union mounting means comprises, in combination: a rotary union cavity extending inawardly into the adapter body and substantially dynamically balanced about the shaft rotation axis, with the body portion of the rotary union being received within the rotary union cavity and in the same rotatable position as the adapter body.

17. The dual-rotary union, rotational isolation adapter of claim 16 further comprising, in combination: means for sealing the body portion within the rotary union cavity to form a fluid chamber by and between the body portion and the rotary union cavity; and wherein the fluid communication means comprises, in combination: means for providing fluid communication between the second fluid communication member and the fluid chamber; and means for providing fluid communication from the fluid chamber and externally of the adapter body.

18. The dual-rotary union, rotational isolation adapter of claim 11 wherein the removeably connecting means comprises, in combination: a threaded, internal cavity extending longitudinally inwardly from the end of the shaft; and a threaded portion formed adjacent the second end of the pin for threadable receipt in the threaded, internal cavity of the shaft.

19. The dual-rotary union, rotational isolation adapter of claim 11 wherein the rotary union mounting means comprises, in combination: a rotary union cavity extending inwardly into the adapter body and substantially dynamically balanced about the shaft rotation axis; and means for mounting the rotary union within the rotary union cavity with the first fluid communication member being rotatable with respect to the adapter body.

20. The dual-rotary union, rotational isolation adapter of claim 19 further comprising, in combination: means for sealing the rotary union cavity to form a fluid chamber by and between the rotary union and the rotary union cavity; and wherein the fluid communication means comprises, in combination: means for providing fluid communication between the first fluid communication member and the fluid chamber; and means for providing fluid communication from the fluid chamber and externally of the adapter body.

* * * * *

UNITED STATES PATENT OFFICE
CERTIFICATE OF CORRECTION

Patent No. 4,557,506         Dated   December 10, 1985

Inventor(s)  James V. Hanks and Leonid Dayen

It is certified that error appears in the above-identified patent and that said Letters Patent are hereby corrected as shown below:

Column 6, line 36, cancel "2" and substitute therefor --3--.

Signed and Sealed this

Fourth Day of March 1986

[SEAL]

Attest:

Attesting Officer

DONALD J. QUIGG

Commissioner of Patents and Trademarks